United States Patent
Chen et al.

(10) Patent No.: US 9,181,451 B2
(45) Date of Patent: Nov. 10, 2015

(54) FORMABLE AMINOPLAST RESIN-BASED COATING COMPOSITIONS

(71) Applicant: SDC Technologies, Inc., Irvine, CA (US)

(72) Inventors: Xiangxu Chen, Diamond Bar, CA (US); Ren-Zhi Jin, Irvine, CA (US)

(73) Assignee: SDC TECHNOLOGIES, INC., Irvine, CA (US)

( * ) Notice: Subject to any disclaimer, the term of this patent is extended or adjusted under 35 U.S.C. 154(b) by 59 days.

(21) Appl. No.: 14/180,378

(22) Filed: Feb. 14, 2014

(65) Prior Publication Data

US 2015/0064457 A1 Mar. 5, 2015

Related U.S. Application Data

(60) Provisional application No. 61/872,244, filed on Aug. 30, 2013.

(51) Int. Cl.
  *C09D 161/20* (2006.01)
  *C09D 161/28* (2006.01)
(52) U.S. Cl.
  CPC ............ *C09D 161/20* (2013.01); *C09D 161/28* (2013.01); *Y10T 428/31507* (2015.04); *Y10T 428/31942* (2015.04)
(58) Field of Classification Search
  CPC .... C09D 161/20; C09D 161/28; C08K 5/053; C08K 5/3475; C08L 67/04; C08L 69/005
  USPC .............. 428/412, 337, 524; 524/91
  See application file for complete search history.

(56) References Cited

U.S. PATENT DOCUMENTS

| | | | |
|---|---|---|---|
| 4,021,505 A | 5/1977 | Wang | |
| 4,197,392 A | 4/1980 | Moore | |
| 4,201,832 A | 5/1980 | Hall et al. | |
| 4,552,936 A | 11/1985 | Moore | |
| 4,714,657 A | 12/1987 | Quinn et al. | |
| 4,913,974 A | 4/1990 | Moore et al. | |
| 6,225,434 B1 | 5/2001 | Sadvary et al. | |
| 7,960,031 B2 | 6/2011 | Pickett et al. | |
| 2007/0231576 A1* | 10/2007 | Davis et al. | 428/412 |
| 2007/0231577 A1* | 10/2007 | Caillouette et al. | 428/412 |
| 2010/0086500 A1* | 4/2010 | Chang | 424/59 |

OTHER PUBLICATIONS

International Search Report for PCT Patent Application No. PCT/US2014/016341, pp. 1-4, mailed Jun. 27, 2014.
Written Opinion for PCT Patent Application No. PCT/US2014/016341, pp. 5-10, mailed Jun. 27, 2014.

* cited by examiner

*Primary Examiner* — Thao T Tran
(74) *Attorney, Agent, or Firm* — Calfee, Halter & Griswold LLP

(57) ABSTRACT

Disclosed herein are aminoplast resin-based coating compositions that provide formable, abrasion-resistant, and weatherable coatings when cured on the substrate. The coating compositions comprise an aminoplast resin; a curing catalyst; a first polyol having an average molecular weight greater than 300; a second polyol having an average molecular weight less than or equal to 300; and at least 5% by weight solids of at least two 2-hydroxyphenol benzotriazole (HPBT)-containing compounds based on the total solids of the coating composition. Also disclosed herein are articles comprising coatings cured from such coating compositions.

19 Claims, No Drawings

FORMABLE AMINOPLAST RESIN-BASED COATING COMPOSITIONS

RELATED APPLICATIONS

This application claims priority to and any benefit of U.S. provisional patent application No. 61/872,244 for FORMABLE AMINOPLAST RESIN-BASED COATING COMPOSITIONS, filed on Aug. 30, 2013, the entire disclosure of which is fully incorporated herein by reference.

FIELD OF THE DISCLOSURE

This disclosure relates to aminoplast resin-based coating compositions that provide abrasion resistant, formable, and weatherable coatings for transparent plastic substrates.

BACKGROUND

Transparent plastic materials, e.g., high molecular weight organic polymers, have been widely used in a variety of optical and glazing applications. Polycarbonate sheets are popular for use in such applications due to their formability, high transparency, and high impact resistance. Polycarbonate polymers can be represented by the general chemical structure shown in Formula (I).

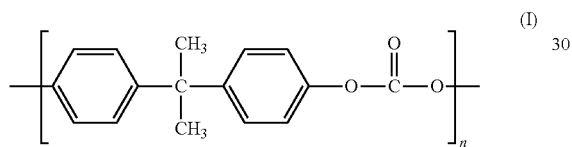

Due to its aromatic moieties, polycarbonates and other plastics having aromatic moieties are susceptible to weathering, which is the degradation of the polymer from exposure to ultraviolet (UV) light. To improve the service life, and hence, weatherability of these plastics, a coating containing a UV-absorber may be applied to the plastic. Major classes of UV absorbers include, but are not limited to, the following three chemical groups: 1) 2-hydroxy-benzophenones (BPs), 2) 2-(2-hydroxyphenyl)-benzotriazoles (HPBTs), and 3) 2-hydroxyphenyl-s-triazines (HPTs).

Certain transparent plastic materials, such as polycarbonates, are soft and tend to scratch or mar quite easily. Scratching or marring results in impaired visibility and poor aesthetics, and often may require the replacement of the transparent plastic. To prevent such scratching or marring, the plastic can be coated with an abrasion resistant coating as a protective coat over the material. Coatings that are "harder" or have a "firmer" surface provide more resistance to abrasion than "soft" or "tacky" coatings.

Certain transparent plastic materials, such as polycarbonate polymers, are formable. Formable materials are those in which the starting material is made pliable in some manner, and is then formed (shaped) and set into a desired, finished shape. Thermoforming is one type of forming process that may be used on formable materials. Thermoforming is a manufacturing process where a plastic sheet is heated to a pliable forming temperature, formed to a specific shape in a mold, and trimmed to create a usable product. More specifically, the sheet, or "film" when referring to thinner gauges and certain material types, is heated in an oven to a sufficiently high temperature that it can be stretched into or onto a mold and cooled to a finished shape. In many glazing and optical applications, it may be beneficial or even necessary to apply an abrasion resistant or weatherable coating to the transparent plastic material prior to forming the plastic into the finished shape. However, not all such weatherable and abrasion resistant coatings are compatible with the forming processes, such as thermoforming, because the coatings may crack or craze when the underlying transparent plastic substrate is subjected to changes in shape.

SUMMARY

In accordance with embodiments of the present disclosure, aminoplast resin-based coating compositions for polymer substrates, preferably polycarbonate substrates, are disclosed herein. The disclosed coating compositions provide formable, abrasion-resistant, and weatherable coatings when cured on the substrate. The cured coatings also have excellent adhesion to the polymer substrates.

In accordance with one embodiment, the coating composition comprises an aminoplast resin; a curing catalyst; a first polyol having an average molecular weight greater than 300; a second polyol having an average molecular weight less than or equal to 300; and at least 5% by weight solids of at least two 2-hydroxyphenol benzotriazole (HPBT)-containing compounds based on the total solids of the coating composition.

The at least two HPBT-containing compounds are represented by Formula (II) below:

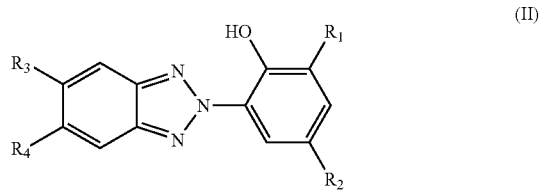

where:
$R_1$ is selected from the group consisting of a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;

$R_2$ is selected from one of the following groups (a), (b), and (c):
(a) a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;
(b) a chemical moiety having from 1 to 100 total carbon and oxygen atoms, having at least one ester moiety, and being free of a —OCH$_2$CH$_2$O— moiety; and
(c) a chemical moiety having from 1 to 100 total carbon and oxygen atoms, having at least one ester moiety, and having at least one —OCH$_2$CH$_2$O— moiety;

$R_3$ is selected from the group consisting of a hydrogen atom, a fluoride atom, a chloride atom, a bromide atom, a iodine atom, and an alkyl group having from 1 to 10 carbon atoms; and $R_4$ is selected from the group consisting of a hydrogen atom, a fluoride atom, a chloride atom, a bromide atom, a iodine atom, and an alkyl group having from 1 to 10 carbon atoms.

In accordance with the coating compositions disclosed herein, at least one of $R_1$, $R_2$, $R_3$, and $R_4$ is not hydrogen, and the at least two HPBT-containing compounds have an $R_2$ selected from at least two of (a), (b) and (c).

In accordance with another embodiment, articles are disclosed. The article comprises a substrate and a coating coated on at least one surface of the substrate. The coating is prepared by curing the coating compositions of the preceding embodiment on the substrate. Preferably, the substrate is a transparent polymer such as a polycarbonate plastic.

DETAILED DESCRIPTION

Unless otherwise indicated herein, the term "average molecular weight" refers to the number average molecular weight ($M_n$) of the compound.

Disclosed herein are coating compositions for polymer substrates, preferably polycarbonate substrates, which provide formable, abrasion-resistant, and weatherable coatings when cured. Coatings that cure from the compositions disclosed herein also have excellent adhesion to the polymer substrates. The coating compositions comprise an aminoplast resin; a curing catalyst; a first polyol having an average molecular weight greater than 300; a second polyol having an average molecular weight less than or equal to 300; and at least 5% by weight solids of at least two 2-hydroxyphenol benzotriazole (HPBT)-containing compounds based on the total solids of the coating composition.

The at least two HPBT-containing compounds are represented by Formula (II):

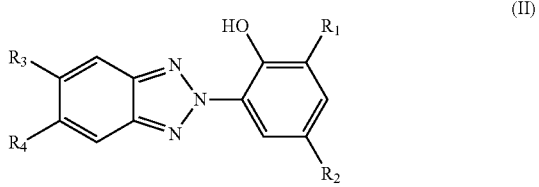

where:
R$_1$ is selected from the group consisting of a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;
R$_2$ is selected from one of the following groups (a), (b), and (c):
  (a) a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;
  (b) a chemical moiety having from 1 to 100 total carbon and oxygen atoms, having at least one ester moiety, and being free of a —OCH$_2$CH$_2$O— moiety; and
  (c) a chemical moiety having from 1 to 100 total carbon and oxygen atoms, having at least one ester moiety, and having at least one —OCH$_2$CH$_2$O— moiety;
R$_3$ is selected from the group consisting of a hydrogen atom, a fluoride atom, a chloride atom, a bromide atom, a iodine atom, and an alkyl group having from 1 to 10 carbon atoms; and
R$_4$ is selected from the group consisting of a hydrogen atom, a fluoride atom, a chloride atom, a bromide atom, a iodine atom, and an alkyl group having from 1 to 10 carbon atoms.

In accordance with the embodiments of the coating compositions disclosed herein, at least one of R$_1$, R$_2$, R$_3$, and R$_4$ is not hydrogen, and the at least two HPBT-containing compounds have an R$_2$ selected from at least two of (a), (b) and (c).

As mentioned above, the coating compositions disclosed herein include an aminoplast resin. The aminoplast resin is the reaction product, specifically a condensation reaction product, of an amine or amide and an aldehyde. A representative reaction used to produce the aminoplast resin is shown as follows.

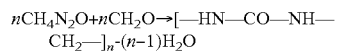

where n(CH$_4$N$_2$O) generally represents a suitable amine or amide that may be used to produce the aminoplast resins disclosed herein; n(CH$_2$O) generally represents a suitable aldehyde that may be used to produce the aminoplast resins disclosed herein; and [—HN—CO—NH—CH$_2$—]$_n$ generally represents the reaction product aminoplast resin. In addition to those represented by n(CH$_4$N$_2$O), examples of other suitable amines and amides used to produce the aminoplast resin include, but are not limited to, urea, melamine, benzoguanamine, glycoluril, and combinations thereof. In addition to those represented by n(CH$_2$O), examples of other suitable aldehydes used to produce the aminoplast resin include, but are not limited to, formaldehyde, acetaldehyde, and combinations thereof. In accordance with certain preferred embodiments, the aminoplast resin is the reaction product of melamine and formaldehyde, i.e., a melamine formaldehyde compound (also referred to as melamine formaldehyde). Examples of commercial available melamine formaldehydes include, but are not limited, to CYMEL 301, 303 (e.g., CYMEL 303LF), and 350 (Cytec Industries Inc. of Woodland Park, N.J.).

The coating compositions disclosed herein also contain a curing catalyst. The curing catalyst is necessary to initiate the crosslinking reactions of the aminoplast resins in the coating composition. Such crosslinking reactions of the aminoplast resins are acid-catalyzed reactions, e.g. the reactions proceed very slowly, if at all, under neutral or alkaline conditions. In accordance with certain embodiments, aminoplast resins are catalyzed only by hydrogen ions. Thus, such aminoplast resins require strong proton donors, i.e., strong acids with a pKa of less than 1, preferably a pKa from −10 to 1 to initiate their reactions. Highly alkylated aminoplast resins are non-limiting examples of the types of aminoplast resins that require strong proton donors catalysts. Non-limiting examples of suitable types of strong proton donor curing catalysts for use with the coating compositions disclosed herein are sulfonic acids, such as para-toluenesulfonic acid (a commercial example is CYCAT 4040, from Cytec Industries Inc. of Woodland Park, N.J.), dodecylbenzene sulfonic acid (a commercial example is NACURE 507, from King Industries, Inc., of Norwalk, Conn.) and dinonylnaphthalene sulfonic acid (a commercial example is NACURE 1051, from King Industries). The sulphonic-type acids are preferred over other proton donors because of their better solubility in organic solvents and because they are less corrosive to application equipment than the more volatile strong mineral acids.

In accordance with certain other embodiments, particularly when the aminoplast resin is a partially alkylated aminoplast resin, a weak acid curing catalyst is preferred. As referred to herein, weak acid catalysts have a pKa value greater than 1, preferably from 1 to 4. Examples of such weak acid catalysts include, but are not limited to, organic acid phosphates (a commercially available example is CYCAT 296-9 of Cytec Industries Inc.).

In accordance with certain embodiments, amines can be used together with either strong or weak acid curing catalysts to achieve better shelf-life stability of the coating composition. Examples of such suitable amines that can be used in combination with the curing catalysts include, but are not limited to, triethylamine, triethanolamine, N,N dimethyl ethanolamine, N,N diethyl ethanolamine, diisopropanolamine, triisopropanolamine.

The coating compositions disclosed herein include at least two polyol compounds. As used herein, a polyol is a monomeric or polymeric compound with multiple hydroxyl functional groups, i.e., two or more hydroxyl moieties. A polyol with two hydroxyl groups is a diol, one with three is a triol, one with four is a tetrol, and so on. Nonlimiting examples of suitable polyol compounds for use in the coating compositions disclosed herein include monomeric polyols such as trimethylolpropane, 1,4-butanediol, 1,6-hexanediol, 1,8-octanediol, pentaerythritol, and the like; and polymeric polyols including but not limited to polyether polyols, such as polyethylene glycol, polypropylene glycol, and poly(tetramethylene ether) glycol; polyester polyols such as polycaprolactone polyols; polycarbonate polyols; polyestercarbonate polyols; polyurethane polyols; and combinations thereof. A polyester polyol contains ester functional groups in its main chain. A polycarbonate polyol contains carbonate functional groups in its main chain. A polyestercarbonate polyol contains both ester and carbonate functional groups in its main chain. A polyurethane polyol contains urethane functional groups in its main chain.

In accordance with the coating compositions disclosed herein, polyols with a larger molecular weight, i.e., a $M_n$ greater than 300, improve formability of the cured coating. Polyols with a smaller molecular weight, i.e., a $M_n$ less than or equal to 300, improve abrasion resistance of the cured coating. In accordance with certain embodiments disclosed herein, the coating compositions include a first polyol having an average molecular weight greater than 300 and a second polyol having an average molecular weight less than or equal to 300. Unless otherwise indicated herein, the term "first polyol" should be understood to refer to one polyol or multiple polyols, with each having an average molecular weight greater than 300. In addition, unless otherwise indicated herein, the term "second polyol" should be understood to refer to one polyol or multiple polyols, with each having an average molecular weight less than or equal to 300. In certain embodiments, the first polyol with the larger molecular weight (e.g., those greater than 300) include polymeric polyols, while the second polyol with the lower relative molecular weights (e.g., those less than or equal to 300) are monomeric polyols. For example, in certain embodiments the first polyol is selected from the group consisting of polyether polyols, polyester polyols, polycarbonate polyols, polyestercarbonate polyols, polyurethane polyols, and combinations thereof; and the second polyol is selected from the group consisting of trimethylolpropane, 1,4-butanediol, 1,6-hexanediol, 1,8-octanediol, pentaerythritol, and combinations thereof. In accordance with certain of the preceding and other embodiments, both the first and second polyols are polymeric polyols. For example, in certain embodiments the first polyol, the second polyol, or both the first polyol and the second polyol is selected from the group consisting of polyether polyols, polyester polyols, polycarbonate polyols, polyestercarbonate polyols, polyurethane polyols, and combinations thereof.

The combination of the first and second polyols provides both abrasion resistance and formability to coatings cured from the coating compositions disclosed herein. In accordance with such embodiments, the weight ratios of the first polyol (a polyol having a $M_n$ greater than 300) to the second polyol (a polyol having a $M_n$ less than or equal to 300) ranges from 10:0.1 to 10:5, preferably from 10:0.5 to 10:3.

The coating compositions disclosed herein contain at least two 2-hydroxyphenol benzotriazole (HPBT)-containing compounds based on the total solids of the coating composition. HPBT-containing compounds are a type of UV absorber. As shown in Formula (III) below, HPBT moieties undergo reversible isomeric transitions under UV radiation and heat. This reversible transition enables HPBT to repeatedly absorb UV radiation, thereby making HPBT an effective UV absorber.

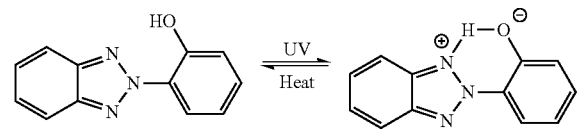

(III)

As is clear from Formula (III), HPBT has an aromatic structure. Aromatic moieties have a tendency to aggregate in non-aromatic coating composition matrices. As a result of this aggregation, especially when the HPBT content of the coating composition is greater than 5% by weight solids of HPBT-containing compounds based on the total solids of the coating composition, crystals form and introduce undesired haze, surface irregularity, or both haze and surface irregularity. To avoid the undesired haze and surface irregularity, in accordance with embodiments of the coating compositions disclosed herein, at least two HPBT-containing compounds with substituted groups are used. The substituent groups may be on the hydroxyphenyl moiety and/or on the benzotriazole moiety of the HPBT-containing compounds. The use of multiple (i.e., at least two) HPBT-containing compounds with substituted groups, according to the embodiments of the coating compositions disclosed herein, improves the solubility of the HPBT-containing compounds in the coating composition, thereby preventing aromatic moiety aggregation and the undesirable haze and surface irregularities associated with the aggregation.

In particular, in accordance with embodiments disclosed herein, the coating compositions contain at least 5%, including from 5% to 12%, including from 5% to 9%, including from 6% to 12%, and including from 6% to 9% by weight solids of the at least two 2-hydroxyphenol benzotriazole (HPBT)-containing compounds based on the total solids of the coating composition. The determination of the amount of HPBT in accordance with the present disclosure, i.e., the "HPBT %," is shown in the Analytical Methods section below. At these amounts of HPBT, the cured coatings of the present disclosure exhibit acceptable clarity and no surface irregularities or uneven surfaces. In accordance with certain embodiments disclosed herein, when there are two HPBT-containing compounds according to Formula (II) herein, the weight ratios of the two HPBT-containing compounds range from 10:90 to 90:10, including from 20:80 to 80:20, and including from 30:70 to 70:30.

As mentioned above, the at least two HPBT-containing compounds used in the coating compositions disclosed herein are represented by Formula (II):

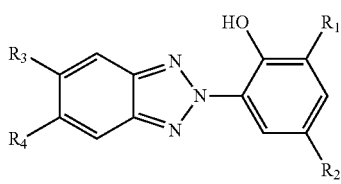

(II)

where:

$R_1$ is selected from the group consisting of a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;

$R_2$ is selected from one of the following groups (a), (b), and (c):
- (a) a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;
- (b) a chemical moiety having from 1 to 100 total carbon and oxygen atoms, having at least one ester moiety, and being free of a —OCH$_2$CH$_2$O— moiety; and
- (c) a chemical moiety having from 1 to 100 total carbon and oxygen atoms, having at least one ester moiety, and having at least one —OCH$_2$CH$_2$O— moiety;

$R_3$ is selected from the group consisting of a hydrogen atom, a fluoride atom, a chloride atom, a bromide atom, a iodine atom, and an alkyl group having from 1 to 10 carbon atoms;

$R_4$ is selected from the group consisting of a hydrogen atom, a fluoride atom, a chloride atom, a bromide atom, a iodine atom, and an alkyl group having from 1 to 10 carbon atoms.

In accordance with the embodiments of the coating compositions disclosed herein, at least one of $R_1$, $R_2$, $R_3$, and $R_4$ is not hydrogen. Notably, the at least two HPBT-containing compounds have an $R_2$ selected from at least two of (a), (b) and (c) (e.g., at least two of the HPBT containing compounds have different $R_2$'s selected from (a), (b), and (c)). It has been discovered that by incorporating at least two HPBT containing compounds with respective $R_2$'s selected from at least two of (a), (b) and (c), the HPBT % in cured coating composition can be higher than that having a single HPBT-containing compound. The higher amount of HPBT (i.e., higher HPBT %), among other things, provides greater protection against weathering, thereby improving the weathering lifetime of the coating composition and the substrate it is protecting.

Examples of specific HPBT containing compounds suitable for use in the coating compositions disclosed herein include, but are not limited to, 2-(2-hydroxy-5-t-octylphenyl)-benzotriazole (represented by Formula (IV) below, commercially available as CYASORB UV-5411 from Cytec), 3-(2H-benzotriazol-2-yl)-5-(1,1-dimethylethyl)-4-hydroxy-octyl-benzenepropanoic acid (represented by Formula (V) below, commercially available as TINUVIN 384-2 from BASF of Ludwigshafen, Germany), β-[3-(2-H-benzotriazole-2-yl)-4-hydroxy-5-tert-butylphenyl]-propionic acid poly (ethylene glycol) 300-ester (represented by Formula (VI) below, where "300-ester" refers to the molecular weight of the poly(ethylene glycol) moiety of this compound), bis{β-[3-(2-H-benzotriazole-2-yl)-4-hydroxy-5-tert-butylphenyl]-propionicacid}-poly(ethylene glycol) 300-ester (represented by Formula (VII) below, where "300-ester" refers to the molecular weight of the poly(ethylene glycol) moiety of this compound), 2-(2H-benzotriazol-2-yl)-6-(1-methyl-1-phenylethyl)-4-(1,1,3,3-tetramethylbutyl) phenol (commercially available as TINUVIN 928 from BASF), and 2-(2H-benzotriazol-2-yl)-4,6-bis(1-methyl-1-phenylethyl) phenol (commercially available as TINUVIN 900 from BASF).

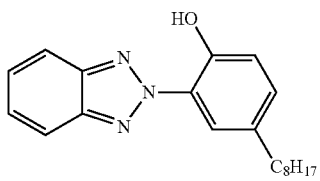

(IV)

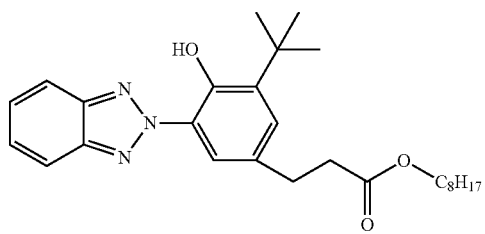

(V)

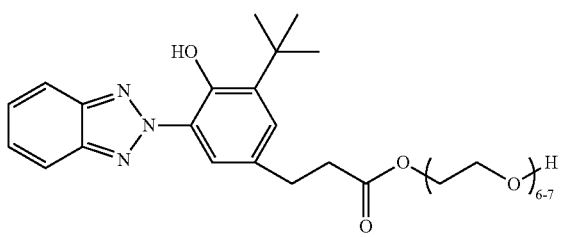

(VI)

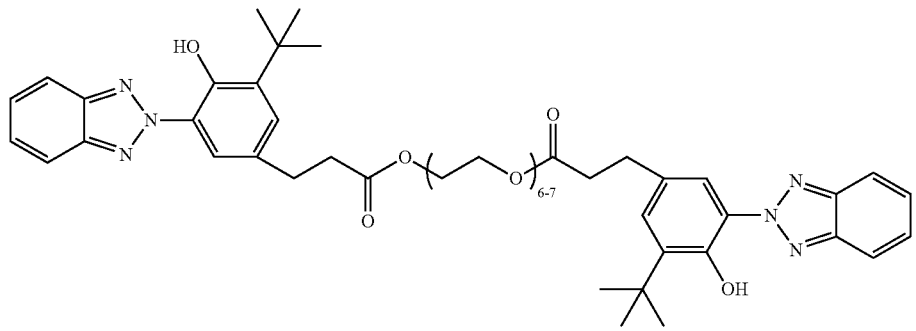

(VII)

In accordance with certain embodiments disclosed herein, the coating composition further comprises a solvent. Suitable solvents are selected from, but are not limited to, alcohols such as methanol, ethanol, isopropanol, n-propanol, n-butanol, 1-methoxy-2-propanol and 1-butoxy-2-propanol, butoxyethanol, and combinations thereof.

In accordance with certain embodiments disclosed herein, the coating compositions may further comprise a blocked polyisocyanate. A blocked polyisocyante is an isocyanate reaction product which is stable at room temperature but dissociates to regenerate isocyanate functionality when heated. Temperatures between 90° C. and 250° C. are necessary to release the blocking groups. When released, the blocking groups generally volatilize from the coating. Suitable blocking groups used to block the polyisocyanates include active-methyl-type, lactam-type, alcohol-type, oxime-type, and phenolic-type blocking agents. Non-limiting specific examples of such blocking groups include dimethylpyrazole (DMP), i.e., 3,5-dimethylpyrazole; methylethylcetoxime (MEKO); and diethyl malonate (DEM). The resulting polyisocyanates can react with other active hydrogen-containing compounds to form thermally stable urethane or urea linkages in the coating. Non-limiting examples of suitable blocked isocyanates include blocked polyisocyanates based on a hexamethylene diisocyanate (HDI), isophorone diisocyanate (IPDI), xylene diisocyanate (XDI), toluene diisocyanate (TDI), diphenylmethane diisocyanate (MDI), any diisocyanates derived from the foregoing, triisocyanates, and combinations thereof. Blocked polyisocyanates based on HDI and IPDI are considered blocked aliphatic polyisocyanates. In accordance with certain of the preceding embodiments, the coating composition comprises a blocked polyisocyanate. In accordance with the preceding and certain preferred embodiments, the blocked isocyanate is a blocked polyisocyanate based on a hexamethylene diisocyanate.

In accordance with one or more embodiments, the coating compositions disclosed herein include a leveling agent. The leveling agent, which may also be known as a flow-control agent, is incorporated into the coating compositions described herein to spread the composition more evenly or level on the surface of the substrate and to provide substantially uniform contact with the substrate. The amount of the leveling agent can vary widely but preferably is used in an amount ranging from about 0.001% to about 10% leveling agent by weight solids of the coating composition. Any conventional, commercially available leveling agent which is compatible with the coating composition and the substrate, which is capable of leveling the coating composition on a substrate, and which enhances wetting between the coating composition and the substrate may be employed. Non-limiting examples of such leveling agents include organic polyethers (commercially available as TRITON X-100, X-405, and N-57 from Rohm and Haas of Philadelphia, Pa.), silicones (such as Paint Additive 3, Paint Additive 29, and Paint Additive 57 from Dow Corning of Midland, Mich. and SILWET L-77 and SILWET L-7600 from Momentive of Columbus, Ohio), fluorosurfactants (such as FLUORAD FC-4430 from 3M Corporation of St. Paul, Minn.), polyacrylates, silicone polyacrylates such as silicone hexaacrylate, and fluoromodified polyacrylates.

In accordance with certain embodiments, the coating compositions disclosed herein comprise the reaction products of the aminoplast resin, the first polyol, the second polyol, and the at least two HPBT-containing compounds according to Formula (II). Such reaction is catalyzed by the curing catalyst. In accordance with certain embodiments, the coating compositions disclosed herein may include other components, such as a solvent or other optional ingredients, e.g., a blocked polyisocyanate, a leveling agent, etc., in addition to the aminoplast resin, the first polyol, the second polyol, and the at least two HPBT-containing compounds according to Formula (II).

The coating compositions disclosed herein are applied as a coating to rigid substrate surfaces or to firm substrate surfaces that are sufficiently elastic to withstand further processing of the substrate, such as flexing or bending, without loss of its properties and without undergoing a non-reversible plastic deformation. In accordance with certain embodiments, the substrates are formable, transparent plastic substrates, such as polycarbonate and polymethyl methacrylate (PMMA). Preferably, the substrate is a polycarbonate plastic substrate.

In accordance with certain embodiments, articles are provided. The articles comprise a substrate and a coating coated on at least one surface of the substrate. The coating is prepared by curing the coating compositions disclosed herein on the substrate. In accordance with certain of the preceding and other embodiments, the substrate is a transparent polymer. In accordance with certain of the preceding and other embodiments, the substrate is a polycarbonate plastic.

As mentioned above, the coating compositions disclosed herein have excellent adhesion to the substrate. In accordance with certain embodiments, it is unnecessary to use a primer on the substrate for the coating composition. Thus, in accordance with certain embodiments, no primer is disposed between the substrate and the coating in the articles disclosed herein. In accordance with certain embodiments, the coating is applied to a polycarbonate substrate without a primer to form an article. In such embodiments, 100% adhesion is achieved following the initial adhesion test (as described below in the Analytical Methods section) to the article. In accordance with certain embodiments, the coating is applied to a polycarbonate substrate without a primer to form an article. In accordance with this embodiment, 100% adhesion is achieved following the boiling water (4 hours) adhesion test (as described below in the Analytical Methods section) to the article. In other embodiments, a primer is disposed between the substrate and the coating composition in the article.

Unless otherwise indicated herein, the terms "formable" and "formability" shall be understood as referring to cured coatings that can be bent at a radius of less than about 25 cm, in accordance with the formability test discussed below in the Analytical Methods section. In accordance with certain embodiments discussed herein, when cured on a substrate having a thickness of 3 mm, the article has a formability radius of less than 13 cm without cracking or crazing the coating. In accordance with certain embodiments, the cured coatings can be bent at a radius of 2.5 cm in accordance with the above procedure without cracking or crazing the coating. In accordance with certain of the preceding embodiments, the substrate was a polycarbonate sheet.

In addition, as mentioned above, the coating compositions disclosed herein are abrasion resistant. The abrasion resistance is evident based on the Taber Abrasion numbers obtained for the cured coating compositions according to the Analytical Methods section disclosed below. In particular, in accordance with certain embodiments, when cured on a polycarbonate substrate having a thickness of 3 mm, the coatings prepared from the coating compositions disclosed herein have Taber Abrasion numbers less than 30%, including less than 20%, including less than 15%, or less than 5% for 100 cycles. In accordance with certain of the preceding embodiments, the substrate was a polycarbonate sheet.

Analytical Methods

Calculation of HPBT %

The chemical structure of unsubstituted HPBT is shown as follows in Formula (VIII), with a molecular weight of 211.

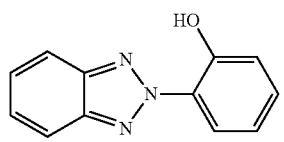

(VIII)

In accordance with this disclosure, the general calculation of HPBT is shown in Equation 1. The weight of HPBT in the uncured coating composition is used for the calculation. The HPBT % is calculated based on total solid content and weight fraction of HPBT-containing ingredients in the uncured coating composition. Unless otherwise indicated herein, the "solids content" and "nonvolatile content" have the same meaning and are interchangeable. Solids content of a coating composition can be determined by measuring the ratio of the weight after 30 minutes of heating at 130° C. to the initial weight. Unless otherwise indicated herein, the solids content is measured using a Sartorius Moisture Analyzer Model MA 35 (Sartorius Weighing Technology GmbH, Germany).

$$HPBT\ \% = 100\% \times \frac{\text{weight of } HPBT \text{ in uncured coating}}{\text{weight of total solids of the uncured coating}}$$

(Equation 1)

For a pure non-volatile chemical compound, the molecular weights of HPBT and the compound can be used directly. Equation 2 is thereby derived from Equation 1.

$$HPBT\ \% = 100\% \times \frac{Mw \text{ of } HPBT \times \text{number of } HPBT \text{ groups}}{Mw \text{ of } HPBT \text{ containing compound}}$$

(Equation 2)

The following example is to further illustrate the calculation according to Equation 2. CYASORB UV-5411 (commercially available from Cytec), which is a nearly 100% chemical compound of 2-(2-hydroxy-5-t-octylphenyl)-benzotriazole (with a molecular weight of 323), contains one HPBT group, and thus has a HPBT content of 65%, as shown in the following calculation based on Equation 2.

$$HPBT\ \% = 100\% \times \frac{211 \times 1}{322} = 65\%$$

For a mixture of HPBT-containing compounds, the HPBT % in the mixture is the weighted sum of HPBT % of each compound in the mixture. Equation 3 is thus derived from Equation 1.

$$HPBT\ \% = 100\% \times \Sigma_{i=1}^{p} \frac{211 \times (N_{HPBT})_i}{(Mw)_i} \times f_i$$

(Equation 3)

where:
i=a HPBT-containing compound in the mixture;
p=total number of HPBT-containing compounds in the mixture;
$(N_{HPBT})_i$=number of HPBT groups in compound i;
$(Mw)_i$=Molecular weight of compound i; and
$f_i$=Weight fraction of compound i in the mixture.

The following examples are to further illustrate the calculation based on Equation 3. TINUVIN 384-2 (commercially available from BASF), is a mixture consisting 95% of the HPBT-containing compound 3-(2H-benzotriazol-2-yl)-5-(1,1-dimethylethyl)-4-hydroxy-octyl-benzenepropanoic acid, which has one HPBT functional group and a molecular weight of 451.6. Thus TINUVIN 384-2 has a HPBT content of 44% from Equation 3.

$$HPBT\ \% = 100\% \times \left(\frac{211 \times 1}{451.6} \times 0.95\right) = 44\%$$

TINUVIN 1130 (commercially available from BASF) contains two HPBT-containing compounds, approximately 50% by weight solids of a monomer having a molecular weight of 637, approximately 38% by weight solids of a dimer having a molecular weight of 975 (with two HPBT moieties in each molecule), and approximately 12% by weight solids of a non-HPBT compound. The monomer has a chemical structure of β-[3-(2-H-benzotriazole-2-yl)-4-hydroxy-5-tert-butylphenyl]-propionic acid poly(ethylene glycol) 300-ester, and the dimer has a chemical structure of bis{β-[3-(2-H-benzotriazole-2-yl)-4-hydroxy-5-tert-butylphenyl]-propionic acid} poly(ethylene glycol) 300-ester. Using Equation 3, the HPBT % of TINUVIN 1130 is thus calculated as 33%, as shown below.

$$HPBT\ \% = 100\% \times \left[\left(\frac{211 \times 1}{637} \times 0.50\right) + \left(\frac{211 \times 2}{975} \times 0.38\right)\right] = 33\%$$

In a coating composition, volatile components, such as solvents and small molecules that are produced during the curing process, are generally present. Moreover, commercially available UV absorbers can themselves be mixtures of HPBT containing compounds as illustrated above for TINUVIN 384-2 and TINUVIN 1130. In recognition of this, HPBT % is calculated based on total solid content and weight fraction of HPBT-containing ingredients in the coating composition. Equation 4 is then derived from Equations 1 and 3 as $$HPBT\ \% = \frac{100 \times \Sigma_{j=1}^{n} w_j \times \left(\Sigma_{i=1}^{p} f_i \times \frac{211 \times (N_{HPBT})_i}{(Mw)_i}\right)}{w_s} \quad \text{(Equation 4)}$$

where:
j=a HPBT-containing ingredient in the coating composition;
n=total number of HPBT-containing ingredients in the coating composition;
i=a HPBT-containing compound in ingredient j;
p=total number of HPBT-containing compounds in ingredient j;
$w_j$=weight fraction of HPBT-containing ingredient j in the uncured coating composition; and
$w_s$=weight fraction of total solids in the uncured coating composition (=solids content).

Thus, for the coating composition of Example 1 (below) which has a solids content of 20.8%, 1.51% by weight of TINUVIN 1130 (33% HPBT from Eqn. 3) and 1.88% by weight of CYASORB UV-5411 (65% HPBT from Eqn. 2), the HPBT % of the coating is calculated from Equation 4 as:

$$HPBT\ \% = \frac{100\% \times [(0.0151 \times 0.33) + (0.0188 \times 0.65)]}{0.208} = 8.3\%$$

Adhesion

The initial adhesion is tested using a roll of pressure sensitive tape 3M Brand 600. The test is carried out as follows. Press a strip of pressure sensitive tape and firmly across the surface of the test specimen (coated substrate). Remove the tape by a rapid pull force applied approximately perpendicular (right angle) to the test area. Visually examine tape and test area. 100% adhesion is defined as no any portion of the material tested having been removed from the specimen. The adhesion may also be tested in the same manner as above, but after the coated specimen is soaked in boiling water for 4 hours.

Formability

The formability of the coatings can be tested in the following manner. An oven with a glass plate is preheated to 165° C. A 2.5 cm×10 cm×3 mm coated MAKROLON polycarbonate (Bayer MaterialScience, Germany) test specimen is placed flat on the glass plate and heated at 160° C. for 12 min. The thickness of the coating can be from about 1-20 micrometer (μm) or about 2-10 μm. The sample is removed from the oven and immediately placed on a cylindrical mandrel. The formability of the sample is rated by determining the minimal radius of the mandrel where no cracking, flaking, or detachment of the coating is observed. The formability values reported in the examples below represent the minimal measured radius of the mandrel where no cracking, flaking, or detachment of the coating is observed.

Haze

The evaluation of light transmission and light-scattering properties can be performed by measuring haze according to ASTM D 1003 with a suitable hazemeter. In the present disclosure, a Haze-gard Plus (BYK-Gardner, Columbia, Md.) is used as the hazemeter. The testing area has a diameter of 2.5 cm. A clear sheet has a haze of less than 0.5% and no visible reflective haze.

Abrasion Resistance

For testing abrasion resistance of coated substrates, any of a number of quantitative test methods may be employed, including the Taber Abrasion Test (ASTM D-4060), the Tumble Test, and the Oscillating Sand Test (ASTM F735-81). In addition, there are a number of qualitative test methods that may be used for measuring abrasion resistance, including the Steel Wool Test and the Eraser Test. In the Steel Wool Test and the Eraser Test, coated substrates specimens are scratched under reproducible conditions (constant load, frequency, etc.). The scratched test samples are then compared and rated against standard samples. A semi-quantitative application of these test methods involves the use of an instrument, such as a Spectrophotometer or a Colorimeter, for measuring the scratches on the coated substrate as a haze gain.

The measured abrasion resistance of a cured coating on a substrate, whether measured by the Taber Abrasion Test, Steel Wool Test, Eraser Test, Tumble Test, Bayer Test, etc. is a function, in part, of the cure temperature, cure time, coating thickness, and substrate. In general, higher temperatures and longer cure times result in higher measured abrasion resistance. Normally, the cure temperature and cure time are selected for compatibility with the substrate. However, sometimes less than optimum cure temperatures and cure times are used due to process and/or equipment limitations. It will be recognized by those skilled in the art that other variables, such as coating thickness and the nature of the substrate, will also have an effect on the measured abrasion resistance. In general, for each type of substrate and for each coating composition there will be an optimum coating thickness. The optimum cure temperature, cure time, coating thickness, etc. can be readily determined empirically by those skilled in the art.

The Taber Abrasion Test described in the present disclosure was performed with a Teledyne Model 5150 Taber Abrader (Taber Industries of North Tonawanda, N.Y.) with a 500 g auxiliary load weight and with CS-10F wheels (Taber Industries). Prior to the measurement, the wheels were refaced with the ST-11 refacing stone (Taber Industries). The refacing was performed by 25 revolutions of the CS-10F wheels on the refacing stone. The initial haze of the sample was recorded 4 times with a Haze-gard Plus (BYK-Gardner) equipped with a Taber Abrasion holder (BYK-Gardner). After 100 cycles (revolutions) of the CS-10F wheels on the sample, the haze was recorded again 4 times with a Haze-gard Plus equipped with a Taber Abrasion holder (BYK-Gardner). The average haze was then determined for the initial haze reading, and the average haze was then determined for the haze reading after 100 cycles. The difference between the averaged haze readings at 100 cycles and the average initial haze reading (also known as the haze gain) is reported herein as the Taber Abrasion number.

The Taber Abrasion Test is considered a semi-quantitative method for measuring abrasion resistance. The precision and accuracy of the method is dependent on a number of factors, including the condition of the CS-10F test wheels. Changes in the condition of the CS-10F test wheels can have a significant effect on the outcome of an abrasion resistance test. For example, a change made by Taber Industries in the composition of the CS-10F wheels changed the haze gain on standard samples from 1% haze and 5% haze at 100 and 500 cycles (reported as 1%/15%) respectively, to 7% and 25%, respectively. Throughout the testing conducted herein, all of the samples were tested with the same set of new CS-10F Taber wheels.

Weatherable Properties

To speed up the weathering process, accelerated weathering testing can be applied. One of these methods is known as the QUV accelerated weathering testing that is a laboratory simulation of the damaging forces of weather for the purposes of predicting the relative durability of materials exposed to outdoor environments. Racks of samples are placed in the QUV chamber. Rain and dew systems are simulated by pressurized spray and condensation systems while damaging effects of sunlight are simulated by fluorescent UV lamps. The exposure temperature is automatically controlled. Cyclical weather conditions, such as temperature and moisture, can be simulated. The QUV testing includes at least two types. One type is the UVB (medium wavelength UV), while the other is UVA (longer wavelength UV). Factors that are used to gauge weathering properties include, but are not limited to, haze and yellow index. Under UV exposure, haze and yellow index, alone or collectively, become higher, indicating weathering degradation of the coated plastic materials.

For QUV-B accelerated weathering testing, the procedure of ASTM G 53-88, standard practice for operating light and water exposure apparatus (fluorescent UV-condensation type) for exposure of nonmetallic materials, is followed. The QUV-B Test described in the present disclosure was performed on a QUV/SE Accelerated Weathering Tester, supplied by Q-LAB Corporation (Cleveland, Ohio). The respective size of the specimens is 102 mm long and 76 mm wide. The cyclic conditions were as follows: 8 hours of exposure at 60° C. to UVB lamps of 0.67 W/m$^2$/nm, followed by 4 hours of condensation at 50° C. After 400 hours of exposure, haze and yellow index are measured.

Film thickness of cured coating was measured with a Filmetrics F20-CP Spectrophotometer at wavelength of 632.8 nm based on spectral reflectance methodology.

Yellow index was measured on a Shimadzu UV-1601 spectrophotometer in accordance to ASTM E-313.

EXAMPLES

The following examples are for purposes of illustration only and are not intended to limit the scope of the claims which are appended hereto. All references cited herein are specifically incorporated by reference.

Descriptions of ingredients used in the examples are listed as follows.

CYMEL 303LF: hexamethoxymethylmelamine (Cytec).

CYCAT 4040: a p-toluenesulfonic acid dissolved in solvents (Cytec).

DESMOPHEN C 1200: an aliphatic polyestercarbonate diol, average molecular weight 2000 (Bayer AG of Leverkusen, Germany).

CAPA 3201: a polycaprolactone triol, average molecular weight 2000 (Perstorp of Perstorp, Sweden).

CAPA 3031: a polycaprolactone triol, average molecular weight of 400 (Perstorp).

CAPA 3041: a polycaprolactone triol, average molecular weight 400 (Perstorp).

K-FLEX UD320: an aliphatic polyurethane diol, average molecular weight 380 (King Industries of Norwalk, Conn.)

TINUVIN 1130: a liquid hydroxyphenyl-benzotriazole-type UV absorber (BASF).

TINUVIN 384-2: a liquid hydroxyphenyl-benzotriazole-type UV absorber (BASF).

CYASORB UV-5411: a solid hydroxyphenyl-benzotriazole-type UV absorber (Cytec).

TMP: trimethylolpropane, a triol with an average molecular weight of 134.

PM: 1-methoxy-2-propanol.

PB: 1-butoxy-2-propanol.

FS-61: an anionic fluorosurfactant (DuPont of Wilmington, Del.).

COROC A-620-A2: a polyacrylate leveling agent (surface tension modifier) (Arkema of King of Prussia, Pa.).

DESMODUR BL 3175A: a blocked aliphatic polyisocyanate based on hexamethylene diisocyanate (HDI) and dissolved in aromatic 100 (Bayer Material Science of Leverkusen, Germany).

BYK 333: a silicone surface additive (BYK of Wesel, Germany).

BYK 370: a silicone surface additive (BYK of Wesel, Germany).

BYK 371: a silicone surface additive (BYK of Wesel, Germany).

DAA: di-acetone alcohol.

ESTANE 5715: a polyester type thermoplastic polyurethane (Lubrizol of Wickliffe, Ohio).

COATOSIL 2400: a polyethylene oxide-modified silicone copolymer leveling agent (Momentive).

In each example below, the coating composition was prepared by charging all of the ingredients to a plastic container, followed by stirring for at least 5 hours at room temperature to fully dissolve and mix all of the ingredients. As used herein, the term "room temperature" refers to a temperature ranging from 18° C. to 24° C., including from 20° C. to 22° C., and including 21° C.

Solids content was measured by heating the liquid coating for 30 min at 130° C. using a Sartorius Moisture Analyzer Model MA 35. HPBT content was calculated using Equation 4 (discussed above).

As mentioned above, all Taber Abrasion number data in the examples below was recorded at 100 cycles (revolutions).

Polycarbonate sheets used in these examples were all MAKROLON (commercially available from Sabic of Saudi Arabia). Coating compositions were flow coated on sheets, followed by drying and heat curing in a temperature-controlled forced-air oven.

Example 1

Coating composition of Example 1 was made by mixing the ingredients shown in Table 1, measured in parts per total 100 parts.

TABLE 1

|  | Example 1 |
|---|---|
| CYMEL 303LF | 4.97 |
| CAPA 3201 | 6.41 |
| CAPA 3041 | 2.57 |
| TINUVIN 1130 | 1.51 |
| CYASORB UV-5411 | 1.88 |
| CYCAT 4040 | 0.16 |
| PM | 75.6 |
| DESMODUR BL 3175A | 5.3 |

TABLE 1-continued

|  | Example 1 |
| --- | --- |
| TMP | 1.60 |
| COROC A-620-A2 | 0.01 |

Solid content and HPBT content of the coating composition of Example 1 are shown in Table 2.

TABLE 2

|  | Example 1 |
| --- | --- |
| Solids content | 20.8% |
| HPBT content | 8.3% |

The coating composition of Example 1 was flow coated on polycarbonate sheets of 122 cm in length, 15 cm in width, and 3 mm in thickness; air dried for 30 minutes; and then cured (baked) for 120 minutes at 130° C. in a forced air oven. The initial haze, taken at the 120 cm point along the length of the sheet from the top end (i.e., the top end being where the flow coating starts), formability, initial adhesion, adhesion after soaking in boiling water for 4 hours, and Taber Abrasion number were measured and are shown in Table 3.

TABLE 3

|  | Example 1 |
| --- | --- |
| Initial haze of cured sheet at 120 cm length | 0.24% |
| Formability | 2.5 cm |
| Initial adhesion | 100% |
| Adhesion after boiling water 4 hrs | 100% |
| Taber Abrasion number | 3.1% |

Examples 2 to 4

Coating compositions of Examples 2 to 4 were made by mixing the ingredients shown in Table 4, measured in parts per total 100 parts.

TABLE 4

|  | Example 2 | Example 3 | Example 4 |
| --- | --- | --- | --- |
| CYMEL 303LF | 9.22 | 7.44 | 8.38 |
| CAPA 3201 | 9.62 | 9.39 | 8.78 |
| DESMOPHEN C 1200 | 1.80 | 1.76 | 0.80 |
| CAPA 3041 | 4.01 | 3.91 | 3.59 |
| TINUVIN 1130 | 2.81 | — | — |
| CYASORB UV-5411 | 2.20 | 0.98 | 2.39 |
| TINUVIN 384-2 | — | 3.52 | 1.60 |
| CYCAT 4040 | 0.20 | 0.20 | 0.20 |
| PM | 68.13 | 66.53 | 67.85 |
| DESMODUR BL 3175A | 0.00 | 4.30 | 4.39 |
| TMP | 2.00 | 1.96 | 2.00 |
| COROC A-620-A2 | 0.01 | 0.01 | 0.01 |

Solid content and HPBT content of the coating compositions of Examples 2 to 4 are shown in Table 5.

TABLE 5

|  | Example 2 | Example 3 | Example 4 |
| --- | --- | --- | --- |
| Solids content | 28.9% | 34.1% | 32.1% |
| HPBT content | 8.1% | 6.6% | 7.1% |

The coating compositions of Examples 2 to 4 were flow coated on polycarbonate sheets of 40 cm in length, 10 cm in width, and 3 mm in thickness; air dried for 30 minutes, and then cured (baked) for 120 minutes at 130° C. in a forced air oven. The initial haze (taken at the 38 cm point along the length of the sheet from the top end), formability, initial adhesion, adhesion after soaking in boiling water for 4 hours, and Taber Abrasion number were measured and are shown in Table 6.

TABLE 6

|  | Example 2 | Example 3 | Example 4 |
| --- | --- | --- | --- |
| Initial haze at 38 cm length | 0.10% | 0.12% | 0.12% |
| Formability | 5 cm | 5 cm | 2.5 cm |
| Initial adhesion | 100% | 100% | 100% |
| Adhesion after boiling water 4 hrs | 100% | 100% | 100% |
| Taber Abrasion number | 4.9% | 5.5% | 4.1% |

Example 5

Coating composition of Example 5 was made by mixing the ingredients shown in Table 7, measured in parts per total 100 parts.

TABLE 7

|  | Example 5 |
| --- | --- |
| CYMEL 303LF | 8.20 |
| CAPA 3201 | 7.84 |
| DESMOPHEN C 1200 | 3.16 |
| TINUVIN 1130 | 1.81 |
| CYASORB UV-5411 | 2.03 |
| CYCAT 4040 | 0.17 |
| PM | 74.52 |
| TMP | 2.26 |
| COROC A-620-A2 | 0.02 |

Solid content and HPBT content of the coating composition of Example 5 are shown in Table 8.

TABLE 8

|  | Example 5 |
| --- | --- |
| Solids content | 23.1% |
| HPBT content | 8.3% |

The coating composition of Example 5 was flow coated on polycarbonate sheets of 122 cm in length, 15 cm in width, and 3 mm in thickness; air dried for 30 minutes; and then cured (baked) for 120 minutes at 130° C. in a forced air oven. The initial haze (taken at the 120 cm point along the length of the sheet from the top end), formability, initial adhesion, adhesion after soaking in boiling water for 4 hours, and Taber Abrasion number were measured and are shown in Table 9.

TABLE 9

|  | Example 5 |
| --- | --- |
| Initial haze at 120 cm length | 0.22% |
| Formability | 2.5 cm |
| Initial adhesion | 100% |
| Adhesion after boiling water 4 hrs | 100% |
| Taber Abrasion number | 3.5% |

Example 6 to 8 and Comparative Example A

Coating compositions of Examples 6 to 8 and Comparative Example A were made by mixing the ingredients shown in Table 10, measured in parts per total 100 parts.

TABLE 10

|  | Example 6 | Example 7 | Example 8 | Comparative Example A |
|---|---|---|---|---|
| CYMEL 303LF | 7.72 | 7.49 | 7.73 | 7.96 |
| DESMOPHEN C 1200 | 2.81 | 2.75 | 2.81 | 2.65 |
| K-Flex UD320 | 2.96 | 2.45 | 2.69 | 3.02 |
| CAPA 3201 | 5.15 | 5.05 | 4.69 | 4.42 |
| TMP | 1.56 | 1.53 | 1.56 | 1.47 |
| TINUVIN 1130 | 1.72 | 2.29 | 3.12 | 4.42 |
| CYASORB UV-5411 | 1.56 | 1.15 | 0.78 | — |
| CYCAT 4040 | 0.16 | 0.15 | 0.16 | 0.15 |
| PM | 37.29 | 54.13 | 60.76 | 75.83 |
| PB | 39.00 | 22.93 | 15.62 | — |
| FS-61 | 0.07 | 0.08 | 0.09 | 0.08 |

Solid content and HPBT content of the coating compositions of Examples 6 to 8 and Comparative Example A are shown in Table 11.

TABLE 11

|  | Example 6 | Example 7 | Example 8 | Comparative Example A |
|---|---|---|---|---|
| Solids content | 22.4% | 20.6% | 21.2% | 22.1% |
| HPBT content | 7.1% | 7.3% | 7.3% | 6.6% |

The coating compositions of Examples 6 to 8 and Comparative Example A were flow coated on polycarbonate sheets of 122 cm in length, 15 cm in width, and 3 mm in thickness; air dried for 30 minutes; and then cured (baked) for 120 minutes at 130° C. in a forced air oven. The appearance after cure, initial haze (taken at the 120 cm point along the length of the sheet from the top end), formability, initial adhesion, adhesion after soaking in boiling water for 4 hours, and Taber Abrasion number were measured and are shown in Table 12.

TABLE 12

|  | Example 6 | Example 7 | Example 8 | Comparative Example A |
|---|---|---|---|---|
| Appearance after cure | clear | clear | clear | Visible haze |
| Initial haze 120 cm in length | 0.29% | 0.2% | 0.2% | 1% |
| Formability | 2.5 cm | 2.5 cm | 2.5 cm | No data |
| Initial adhesion | 100% | 100% | 100% | 100% |
| Adhesion after boiling water 4 hrs | 100% | 100% | 100% | 100% |
| Taber Abrasion number | 3.8% | 4.6% | 5.7% | No data |

The cured coating of Comparative Example A, in accordance with the present Formula (II) described herein, contains only one HPBT-containing compound (TINUVIN 1130). As shown in Table 12, the cured coating of Comparative Example A had visible haze after cure and a measured initial haze of 1%.

Example 9

Coating composition of Example 9 was made by mixing the ingredients shown in Table 13, measured in parts per total 100 parts.

TABLE 13

|  | Example 9 |
|---|---|
| CYMEL 303LF | 8.52 |
| CAPA 3201 | 6.87 |
| DESMOPHEN C 1200 | 3.30 |
| CAPA 3031 | 6.60 |
| TINUVIN 1130 | 3.30 |
| TINUVIN 384-2 | 2.47 |
| CYCAT 4040 | 0.22 |
| PM | 68.71 |
| COROC A-620-A2 | 0.02 |

Solid content and HPBT content of the coating composition of Example 9 are shown in Table 14.

TABLE 14

|  | Example 9 |
|---|---|
| Solids content | 29.1% |
| HPBT content | 7.5% |

The coating composition of Example 9 was flow coated on polycarbonate sheets of 40 cm in length, 10 cm in width, and 3 mm in thickness; air dried for 30 minutes; and then cured (baked) for 120 minutes at 130° C. in a forced air oven. The appearance after cure, initial haze (taken at the 38 cm point along the length of the sheet from the top end), formability, initial adhesion, adhesion after soaking in boiling water for 4 hours, and Taber Abrasion number were measured and are shown in Table 15.

TABLE 15

|  | Example 9 |
|---|---|
| Appearance after cure | clear |
| Initial haze 38 cm in length | 0.19% |
| Formability | 5 cm |
| Initial adhesion | 100% |
| Adhesion after boiling water 4 hrs | 100% |
| Taber Abrasion number | 6.8% |

Example 10

Coating composition of Example 10 was made by mixing the ingredients shown in Table 16, measured in parts per total 100 parts.

TABLE 16

|  | Example 10 |
|---|---|
| CYMEL 303LF | 7.68 |
| DESMOPHEN C 1200 | 2.79 |
| K-Flex UD320 | 2.95 |
| CAPA 3201 | 5.12 |
| TMP | 1.55 |
| TINUVIN 1130 | 1.71 |
| CYASORB 5411 | 1.55 |
| CYCAT 4040 | 0.16 |
| PB | 37.07 |

TABLE 16-continued

|  | Example 10 |
| --- | --- |
| PM | 38.78 |
| Triethylamine (10% in PM) | 0.39 |
| COATOSIL 2400 (10% in PM) | 0.26 |

Solid content and HPBT content of the coating composition of Example 10 are shown in Table 17.

TABLE 17

|  | Example 10 |
| --- | --- |
| Solids content | 21.8% |
| HPBT content | 7.2% |

The coating composition of Example 10 was flow coated on polycarbonate sheets of 122 cm in length, 15 cm in width, and 3 mm in thickness; air dried for 30 minutes; and then cured (baked) for 120 minutes at 130° C. in a forced air oven. The appearance after cure, initial haze (taken at the 120 cm point along the length of the sheet from the top end), formability, initial adhesion, adhesion after soaking in boiling water for 4 hours, and Taber Abrasion number were measured and are shown in Table 18.

TABLE 18

|  | Example 10 |
| --- | --- |
| Appearance after cure | Clear |
| Initial haze 120 cm in length | 0.24% |
| Formability | 2.5 cm |
| Initial adhesion | 100% |
| Adhesion after boiling water 4 hrs | 100% |
| Taber Abrasion number | 3.2% |

Example 11

Coating composition of Example 11 was made by mixing the ingredients shown in Table 19, measured in parts per total 100 parts.

TABLE 19

|  | Example 11 |
| --- | --- |
| CYMEL 303LF | 5.80 |
| CAPA 3201 | 9.02 |
| CAPA 3041 | 3.87 |
| TINUVIN 1130 | 1.93 |
| CYASORB UV-5411 | 2.25 |
| CYCAT 4040 | 0.19 |
| PM | 70.87 |
| DESMODUR BL 3175 | 5.15 |
| Hexanediol | 0.90 |
| COROC A-620-A2 | 0.01 |

Solid content and HPBT content of the coating composition of Example 11 are shown in Table 20.

TABLE 20

|  | Example 11 |
| --- | --- |
| Solids content | 25.4% |
| HPBT content | 8.3% |

The coating composition of Example 11 was flow coated on polycarbonate sheets of 40 cm in length, 10 cm in width, and 3 mm in thickness; air dried for 30 minutes; and then cured (baked) for 120 minutes at 130° C. in a forced air oven. The appearance after cure, initial haze (taken at the 38 cm point along the length of the sheet from the top end), formability, initial adhesion, adhesion after soaking in boiling water for 4 hours, and Taber Abrasion number were measured and are shown in Table 21.

TABLE 21

|  | Example 11 |
| --- | --- |
| Appearance after cure | Clear |
| Initial haze 38 cm in length | 0.2% |
| Formability | 3.8 cm |
| Initial adhesion | 100% |
| Adhesion after boiling water 4 hrs | 100% |
| Taber Abrasion number | 10.1% |

Comparative Example B

Coating composition of Comparative Example B was made by mixing the ingredients shown in Table 22, measured in parts per total 100 parts.

TABLE 22

|  | Comparative Example B |
| --- | --- |
| CYMEL 303LF | 3.59 |
| CAPA 3041 | 5.99 |
| CYCAT 4040 | 0.36 |
| BYK 333 | 0.01 |
| PM | 47.90 |
| DAA | 31.13 |
| DESMODUR BL 3175A | 2.39 |
| CYASORB UV-5411 | 2.39 |
| ESTANE 5715 | 6.23 |

Solid content and HPBT content of the coating composition of Comparative Example B are shown in Table 23. The cured coating of Comparative Example B, in accordance with the present Formula (II) described herein, contains only one HPBT-containing compound (CYASORB UV-5411).

TABLE 23

|  | Comparative Example B |
| --- | --- |
| Solid content | 18.8% |
| HPBT content | 8.3% |

The coating composition of Comparative Example B was flow coated on polycarbonate sheets of 40 cm in length, 10 cm in width, and 3 mm in thickness; air dried for 30 minutes. After drying, crystals formed on the sheets. The sheets were then cured (baked) for 120 minutes at 130° C. in a forced air oven. After cure, the areas that had crystals at drying had uneven surfaces and the coating was not acceptable for transparent applications, e.g., glazing or optical applications.

Example 12, Comparative Examples C and D

Coating compositions were made by adding these ingredients, measured in parts per total 100 parts, shown in Table 24.

TABLE 24

|  | Example 12 | Comparative Example C | Comparative Example D |
|---|---|---|---|
| Capa 3201 | 4.75 | 4.74 | 4.75 |
| Cymel 303LF | 7.12 | 9.13 | 9.16 |
| Desmophen C 1200 | 2.59 | 3.05 | 3.05 |
| K-Flex UD320 | 2.74 | 3.38 | 3.4 |
| TMP | 1.44 | 1.76 | 1.76 |
| Tinuvin 1130 | 1.58 | 1.01 | 0.61 |
| Cyasorb UV-5411 | 1.49 | 0.91 | 1.12 |
| Triethylamine | 0.043 | 0.07 | 0.07 |
| Cycat 4040 | 0.15 | 0.16 | 0.16 |

TABLE 24-continued

|  | Example 12 | Comparative Example C | Comparative Example D |
|---|---|---|---|
| BYK-370 | 0.05 | 0.07 | 0.07 |
| BYK-371 | 0.04 | 0.07 | 0.07 |
| PM | 64 | 43 | 43.2 |
| PB | 14 | 32.6 | 32.6 |

Solid content and HPBT content of the coating compositions of Example 12, Comparative Example C, and Comparative Example D are shown in Table 25.

TABLE 25

|  | Example 12 | Comparative Example C | Comparative Example D |
|---|---|---|---|
| Solids content | 20.0% | 20.1% | 20.3% |
| HPBT content | 7.4% | 4.6% | 4.5% |

Coating compositions were flow coated on polycarbonate sheets with 122 cm in length, 40 cm in width and 3 mm in thickness, air dried for 30 minutes, and baked for 120 minutes at 130° C. in a forced air oven. The appearance after cure, initial haze (taken at the 120 cm point along the length of the sheet from the top end), formability, initial adhesion, adhesion after soaking in boiling water for 4 hours, and Taber Abrasion number were measured and are shown in Table 26.

TABLE 26

|  | Example 12 | Comparative Example C | Comparative Example D |
|---|---|---|---|
| Appearance after cure | Clear | Clear | Clear |
| Initial haze at 120 cm in length | 0.27% | 0.31% | 0.30% |
| Formability | 2.5 cm | 2.5 cm | 2.5 cm |
| Initial adhesion | 100% | 100% | 100% |
| Adhesion after boiling water 4 hrs | 100% | 100% | 100% |
| Taber Abrasion number | 3.6% | 3.3% | 3.2% |

A piece of sample with the size of 10.2 cm long by 7.6 cm wide was cut from top end (starting at 10.2 cm from the top end) of each coated sheet. Film thickness, initial haze and yellow index of this sample were measured and are shown in Table 27. After 400 hours of exposure under QUV-B conditions, haze, and yellow index were measured and are shown in Table 27. An uncoated polycarbonate (PC) sheet was also subjected to the same testing and results are shown in Table 27.

TABLE 27

|  | Example 12 | Comparative Example C | Comparative Example D | Uncoated PC |
|---|---|---|---|---|
| Film thickness | 2.7 μm | 2.7 μm | 2.7 μm | Not applicable |
| Initial yellow index | 1.38 | 1.34 | 1.46 | 0.99 |
| Initial haze | 0.26% | 0.23% | 0.21% | 0.29% |
| Yellow index after QUV-B 400 h | 5.11 | 10.89 | 12.74 | 12.31 |
| Haze after QUV-B 400 h | 0.31% | 0.31% | 0.36% | 1.49% |

The difference of film thickness of all three coated sheets is within testing accuracy. For Example 12, after 400 hours of QUV-B exposure, yellow index increased 3.73 and haze only increased 0.05%. For Comparative examples C and D, after 400 hours of QUV-B exposure, yellow index increased 9.55 and 11.28, respectively, and haze increased 0.08% and 0.15%, respectively. For uncoated polycarbonate, yellow index increased 11.32 and haze increased 1.20%. All these results indicate that Example 12 has significantly better weatherable properties as compared to Comparative Examples C & D and uncoated PC.

Example 13

Coating compositions were made by adding these ingredients, measured in parts per total 100 parts, shown in Table 28.

TABLE 28

|  | Example 13 |
|---|---|
| Capa 3201 | 5.9 |
| Cymel 303LF | 10.32 |
| Desmophen C 1200 | 2.95 |
| K-Flex UD320 | 2.7 |
| TMP | 1.47 |
| Tinuvin 1130 | 2.21 |
| Cyasorb UV-5411 | 1.62 |
| Triethylamine | 0.05 |
| Cycat 4040 | 0.16 |
| BYK-370 | 0.05 |
| BYK-371 | 0.05 |
| PM | 51.9 |
| PB | 20.64 |

Solid content and HPBT content of the coating composition of Example 13 are shown in Table 29.

TABLE 29

|  | Example 13 |
| --- | --- |
| Solids content | 24.5% |
| HPBT content | 7.3% |

Coating compositions were flow coated on polycarbonate sheets with 122 cm in length, 15 cm in width and 3 mm in thickness, air dried for 30 minutes, and baked for 120 minutes at 130° C. in a forced air oven. The appearance after cure, initial haze (taken at the 122 cm point along the length of the sheet from the top end), formability, initial adhesion, adhesion after soaking in boiling water for 4 hours, and Taber Abrasion number were measured and are shown in Table 30.

TABLE 30

|  | Example 13 |
| --- | --- |
| Appearance after cure | Clear |
| Initial haze at 122 cm in length | 0.3% |
| Formability | 2.5 cm |
| Initial adhesion | 100% |
| Adhesion after Boiling water 4 hrs | 100% |
| Taber Abrasion number | 2.9% |

Unless otherwise indicated herein, all sub-embodiments and optional embodiments are respective sub-embodiments and optional embodiments to all embodiments described herein. While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application, in its broader aspects, is not limited to the specific details and illustrative examples shown and described. Accordingly, departures may be made from such details without departing from the spirit or scope of the applicant's general disclosure herein.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B), it is intended to mean "A or B or both." When the applicants intend to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

Accordingly, unless otherwise indicated, the numerical properties set forth in the description and claims are approximations that may vary depending on the desired properties sought to be obtained in embodiments of the present disclosure. Notwithstanding that the numerical ranges and parameters setting forth the broad scope of the invention are approximations, the numerical values set forth in the specific examples are reported as precisely as possible.

As used in the description of the invention and the appended claims, the singular forms "a," "an," and "the" are intended to include the plural forms as well, unless the context clearly indicates otherwise.

What is claimed is:

1. A coating composition for transparent substrates which provides a formable, abrasion-resistant, and weatherable coating when cured, the coating composition comprising:
   (i) an aminoplast resin;
   (ii) a curing catalyst;
   (iii) a first polyol having an average molecular weight greater than 300;
   (iv) a second polyol having an average molecular weight less than or equal to 300; and
   (v) at least 5% by weight solids of at least two 2-hydroxyphenol benzotriazole (HPBT)-containing compounds based on the total solids of the coating composition,
   wherein each of the at least two HPBT-containing compounds are represented by the formula:

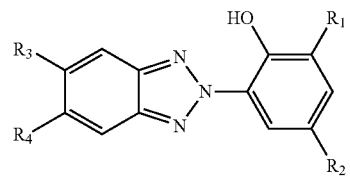

wherein $R_1$ is selected from the group consisting of a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;
   wherein $R_2$ is selected from one of the following groups (a), (b), and (c):
   (a) a hydrogen atom, a monovalent hydrocarbyl group having from 1 to 50 carbon atoms, a divalent hydrocarbyl group having from 1 to 50 carbon atoms, and a trivalent hydrocarbyl group having from 1 to 50 carbon atoms;
   (b) a chemical moiety having from 1 to 100 total carbon and oxygen atoms, having at least one ester moiety, and being free of a —$OCH_2CH_2O$— moiety; and
   (c) a chemical moiety having from 1 to 100 total carbon and oxygen atoms, having at least one ester moiety, and having at least one —$OCH_2CH_2O$— moiety;
   wherein $R_3$ is selected from the group consisting of a hydrogen atom, a fluoride atom, a chloride atom, a bromide atom, a iodine atom, and an alkyl group having from 1 to 10 carbon atoms;
   wherein $R_4$ is selected from the group consisting of a hydrogen atom, a fluoride atom, a chloride atom, a bromide atom, a iodine atom, and an alkyl group having from 1 to 10 carbon atoms,
   wherein at least one of $R_1$, $R_2$, $R_3$, and $R_4$ is not hydrogen;
   wherein at least two of the HPBT-containing compounds have a different $R_2$.

2. The composition of claim 1, wherein the composition comprises from 6% to 12% by weight solids of the mixture of the at least two HPBT-containing compounds based on the total solids of the coating composition.

3. The composition of claim 1, wherein the aminoplast resin is the reaction product of an amine and an aldehyde,
   wherein the amine is selected from the group consisting of urea, melamine, benzoguanamine, glycoluril, and combinations thereof; and
   wherein the aldehyde is selected from the group consisting of formaldehyde, acetaldehyde, and combinations thereof.

4. The composition of claim 1, wherein the aminoplast resin is a melamine formaldehyde.

5. The composition of claim 1, wherein the second polyol is selected from the group consisting of trimethylolpropane, 1,4-butanediol, 1,6-hexanediol, 1,8-octanediol, pentaerythritol, and combinations thereof.

6. The composition of claim 5, wherein the first polyol is selected from the group consisting of polyether polyols, polyester polyols, polycarbonate polyols, polyestercarbonate polyols, polyurethane polyols, and combinations thereof.

7. The composition of claim 1, wherein the first polyol, the second polyol, or both the first polyol and the second polyol is selected from the group consisting of polyether polyols, polyester polyols, polycarbonate polyols, polyestercarbonate polyols, polyurethane polyols, and combinations thereof.

8. The composition of claim 1, wherein the curing catalyst is selected from the group consisting of sulphonic acids and organic acid phosphates.

9. The composition of claim 1, wherein the composition comprises the reaction products of the aminoplast resin, the first polyol, the second polyol, and the at least two HPBT-containing compounds catalyzed by the curing catalyst.

10. The composition of claim 1 further comprising a blocked polyisocyanate.

11. An article comprising a substrate and a coating coated on at least one surface of the substrate, wherein the coating is prepared by curing the coating composition of claim 1 on the substrate.

12. The article of claim 11, wherein the substrate is a transparent polymer.

13. The article of claim 11, wherein the substrate is a polycarbonate plastic.

14. The article of claim 13, wherein no primer is disposed between the substrate and the coating.

15. The article of claim 13, wherein after the coating has cured on the substrate, and the substrate has a thickness of 3 mm, the article has a formability radius of less than 13 cm without cracking or crazing the coating.

16. The article of claim 13, wherein after the coating has cured on the substrate, and the substrate has a thickness of 3 mm, the coating has a Taber Abrasion number less than 15% after 100 cycles.

17. The article of claim 11, wherein no primer is disposed between the substrate and the coating.

18. The article of claim 17, wherein after the coating has cured on the substrate, and the substrate has a thickness of 3 mm, the article has a formability radius of less than 13 cm without cracking or crazing the coating.

19. The article of claim 17, wherein after the coating has cured on the substrate, and the substrate has a thickness of 3 mm, the coating has a Taber Abrasion number less than 15% after 100 cycles.

* * * * *